United States Patent [19]
Navin et al.

[11] Patent Number: 5,655,692
[45] Date of Patent: Aug. 12, 1997

[54] DISPENSING MECHANISM WITH QUICK-CONNECT AUGER SHAFT COUPLING

[75] Inventors: James P. Navin; David J. Hill, both of Racine, Wis.

[73] Assignee: Spee-Dee Packaging Machinery Inc., Sturtevant, Wis.

[21] Appl. No.: 704,087

[22] Filed: Aug. 28, 1996

[51] Int. Cl.$^6$ ................................................. G01F 11/20
[52] U.S. Cl. ..................... 222/413; 403/312; 403/319; 403/348
[58] Field of Search ....................... 222/412, 413; 403/309, 310, 312, 313, 315, 318, 319, 348, 349, 353

[56] References Cited

U.S. PATENT DOCUMENTS

| | | | |
|---|---|---|---|
| 1,171,380 | 2/1916 | Arthur | 403/349 X |
| 1,479,583 | 1/1924 | Carey | 403/315 |
| 1,792,363 | 2/1931 | Dehuff | 403/348 |
| 1,900,258 | 3/1933 | Schiff | 403/319 |
| 2,192,844 | 3/1940 | Bean | 403/349 X |
| 2,328,988 | 9/1943 | Martin | 403/318 |
| 2,901,258 | 8/1959 | Brandafi | 403/349 X |
| 4,483,400 | 11/1984 | Arndt | 403/349 X |
| 5,170,914 | 12/1992 | Shalit | 222/413 |

FOREIGN PATENT DOCUMENTS

| | | | |
|---|---|---|---|
| 646819 | 11/1928 | France | 403/349 |

*Primary Examiner*—Kevin P. Shaver
*Attorney, Agent, or Firm*—Nilles & Nilles S.C.

[57] ABSTRACT

A quick-connect coupling facilitates the connection of an auger of a dispensing mechanism to the drive shaft of the dispensing mechanism so as to firmly lock the auger from radial, axial, or rotational movement with respect to the drive shaft while inhibiting contamination and facilitating cleaning. The coupling includes a male portion provided on the auger shaft and including one or more pins, a female portion formed in the adapter shaft and including one or more axial and peripheral slots, and a key which firmly locks the pin in the peripheral slot. The key includes a retainer which is affixed to a sleeve or other device serving as a guide and support for the retainer. Upon downward movement of the sleeve along the drive shaft, the retainer acts as a cam to lock the pins in position. If the dispensing mechanism employs an adapter shaft as the drive shaft, an improved quick-connect coupling may also be provided to attach the adapter shaft to the drive mechanism output shaft.

17 Claims, 4 Drawing Sheets

DISPENSING MECHANISM WITH QUICK-CONNECT AUGER SHAFT COUPLING

BACKGROUND OF THE INVENTION

1. Field of the Invention

The invention relates to mechanisms for dispensing granular materials and, more particularly, to a dispensing mechanism including a hopper and a vertically extending, power-rotated auger that dispenses materials from the hopper in measured quantities.

2. Discussion of the Related Art

Dispensing mechanisms of the type mentioned in Section 1. above are well known in the art. They can be used to dispense virtually any granular particulate materials ranging from relatively course granules such as beans and popcorn down to very fine particles such as cake mixes and pharmaceuticals. Materials to be dispensed are stored in a frusto-conical hopper having a central lower opening through which extends the lower or flight-bearing end portion of an auger. The upper end portion of the auger is in turn rotatably coupled to a drive mechanism such an electrical motor and clutch assembly. In the typical arrangement, the drive mechanism is mounted directly above the central opening of the hopper, and an output shaft of the servo assembly is coupled to an adapter shaft which is in turn coupled to the auger shaft by a quick-connect coupling which permits periodic removal of the auger for replacement, cleaning, etc.

Figure 1:
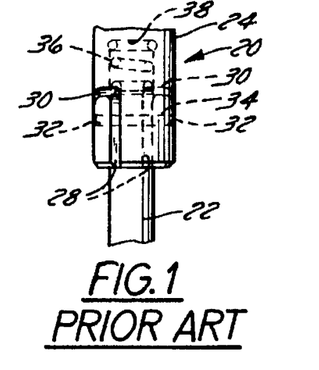
FIGS. 1 and 1A are a side elevation view and a side sectional elevation view, respectively, of a prior art bayonet coupling used to connect an auger shaft of a dispensing mechanism to an adapter shaft of the mechanism and are appropriately labelled "PRIOR ART"
Figure 1A:
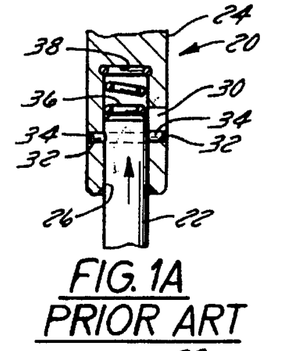

The most prevalent technique for connecting the auger shaft to the adapter shaft (or to another drive shaft if a drive mechanism lacking an adapter shaft is utilized) is a bayonet coupling. Referring to FIGS. 1 and 1A, the typical bayonet coupling 20 includes a male portion and a female portion. The female portion includes a pocket 26 formed in the lower axial end of the adapter shaft 24. A pair of radially opposed, axially extending slots 28 are formed in the peripheral wall of the pocket 26 and terminate in respective peripheral slots 30. Each peripheral slot 30 extends from an inner, relatively narrow section to an outer section of increased diameter serving as a detent 32. The male portion includes the upper end portion of the adapter shaft 22 and a pair of pins 34 located radially opposite one another and extending radially away from the upper end portion of the auger shaft 22.

In use, the upper end portion of the auger shaft 22 is aligned with the lower end portion of the adapter shaft 24 such that the pins 34 are aligned with the axial slots 28. The auger shaft 22 is then lifted into the pocket 26 so that the pins 34 move upwardly through the axial slots 28 into alignment with the opening of the peripheral slots 30. The auger shaft 22 is then rotated so that the pins 34 move into the peripheral slots 30 and drop into the detents 32. The pins 34 are retained in this position by a downward biasing force applied to the auger shaft 22 by a helical spring 36 mounted in a spring chamber 38 located above the slots 30.

While bayonet couplings of the disclosed type provide an effective mechanism for connecting a dispensing auger shaft to an adapter shaft or other drive shaft, they exhibit marked drawbacks and disadvantages.

For instance, it is essential in a variety of applications that the dispensing mechanism be kept as clean as possible and that it be thoroughly cleaned at relatively frequent intervals. However, bayonet couplings are prone to contamination because the materials being dispensed can become tightly lodged between the coils of the return spring and in other areas of the spring chamber. Once these materials are impacted, they are difficult to remove because the return spring prevents a brush or other cleaning implement from being inserted into the spring chamber.

Moreover, during the course of operation of the dispensing mechanism, the ejection of material from the hopper imposes a corresponding upward thrust on the auger as illustrated by the arrow in FIG. 1A. If this upward thrust is strong enough to overcome the biasing forces of the spring, the auger shaft may move upwardly to lift the pins from the base of the detent and, upon subsequent rotation of the auger, may actually become uncoupled from the adapter shaft. Upward movement of the auger also widens the gap between the auger and a lip formed at the bottom of the hopper spout, resulting in loss of accuracy and material drip problems.

Another problem associated with vertical movement of the auger shaft with respect to the adapter shaft is that it imposes backlash on the drive mechanism. Backlash is undesirable, particularly if the drive mechanism comprises a servo assembly, because drive mechanisms in general and servo assemblies in particular do not operate well under the imposition of shifting loads.

Some in the art have addressed the problem of auger shaft movement by affixing a split collar or some other clamp-like device to the auger shaft directly beneath the adapter shaft, thereby preventing vertical movement of the auger shaft with respect to the adapter shaft. However, attachment and removal of the split collar to and from the auger shaft are rather difficult operations because the collar is located in a relatively inaccessible location deep within the hopper. Removal under operational conditions is especially difficult because materials in the hopper inhibit or even prevent access to the split collar. Moreover, the split collar, like the spring chamber, presents crevices in which materials may compact and which are difficult to decontaminate.

Attempts have been made to solve some of the problems associated with conventional bayonet couplings. For instance, U.S. Pat. No. 5,170,914 to Shalit (the Shalit patent) discloses an auger shaft quick-connect coupling which lacks a return spring or a detent. The coupling includes 1) a first sleeve which is secured to the upper end of the auger shaft and 2) a cylindrical shank which is formed integrally with the lower end portion of the drive or adapter shaft and which is sized to snugly fit into a bore formed in the sleeve. A generally T-shaped slot is formed in the lower end portion of the shank and receives a pin fixed rigidly in the sleeve. The auger is attached to the shaft by positioning the auger such that the sleeve is spaced beneath the shank, and the auger is then shifted upwardly to cause the sleeve to telescope into the shank so that the pin passes upwardly within the stem of a T-shaped slot and enters the cross portion thereof. Subsequent rotation of the sleeve causes the pin to move out of alignment with the stem and into the cross portion of the slot. In order to transmit torque from the shaft to the auger, a tube is additionally provided which, when in an active position, rotatably couples the shaft to the auger. A square bore, formed in the tube, receives a complimentary square portion formed in the lower end of the adapter shaft above the shank.

The arrangement disclosed in the Shalit patent, though lacking the springs of conventional bayonet couplings, is relatively complex and difficult to fabricate and to assemble. Moreover, like bayonet couplings, some movement of the auger shaft relative to the adapter or drive shaft appears to be possible after assembly.

Another drawback of conventional dispensing mechanisms is that the connection of the adapter shaft to the motor output shaft is rather complex. It is desirable to provide this connection with the capability to be vertically adjusted so as to facilitate the use of different auger shafts. Traditionally, this vertical adjustment is effected by way of a left hand-threaded connection between the output shaft and the adapter shaft. This connection is rather difficult and expensive to fabricate.

OBJECTS AND SUMMARY OF THE INVENTION

It is therefore a first object of the invention to provide a dispensing mechanism that includes an improved coupling for connecting an auger shaft of the mechanism to a drive shaft and that securely locks the auger against either axial or radial movement with respect to the adapter or drive shaft.

Another object of the invention is to provide a dispensing mechanism the quick-connect coupling of which has the advantages discussed above, which is resistant to contamination from particulates in the hopper of the dispensing mechanism, and which is easily cleaned.

Still another object of the invention is to provide a dispensing mechanism which meets the first and second objects of the mechanism and which is relatively easy to fabricate and to assemble and disassemble.

In accordance with a first aspect of the invention, these objects are achieved by providing a dispensing mechanism comprising a hopper which has a lower discharge opening, a drive mechanism which is located above the hopper, a drive shaft, an auger, and a coupling including a key and mating male and female portions of the drive shaft and the auger. The drive shaft has an upper end portion operatively coupled to the drive mechanism and a lower end portion positioned between the upper end portion thereof and the discharge opening of the hopper and terminating at a bottom surface. The female portion of the coupling includes 1) pocket formed in the lower end portion of the drive shaft, a first slot which extends at least generally axially upwardly from the bottom surface of the lower end portion, and a second slot which extends peripherally from the first slot. The auger includes 1) an auger shaft which extends from the drive shaft through the opening in the hopper and which has an upper end portion positioned within the pocket in the drive shaft, and 2) helical flights which are mounted on a lower end portion of the auger shaft. The male portion of the coupling includes the upper end portion of the auger shaft and a pin which extends away from the auger shaft and which is received in the second slot in the drive shaft. The key locks the pin in the second slot and comprises 1) a sleeve slidably mounted on the lower end portion of the drive shaft and 2) a retainer which is mounted on the sleeve, which is received in the first slot in the drive shaft, and which locks the pin in the second slot. The second slot, the pin, and the retainer are dimensioned and configured such that the retainer prevents the auger shaft from moving axially, radially, or rotationally with respect to the drive shaft by acting as cam which locks the pin in position within the second slot.

Preferably, the retainer extends into the first slot and is chamfered such that a radial inner surface thereof decreases in width from an upper end thereof to a lower end thereof.

A second pin may extend away from the auger shaft, in which case a third slot would extend at least generally axially upwardly from the bottom surface of the lower end portion of the drive shaft and a fourth slot would extend peripherally from the third slot and receive the second pin. In this case, the key would further comprise a second retainer which is mounted on the sleeve, which is received in the third slot in the drive shaft, and which locks the second pin in the fourth slot. The third slot preferably is located radially opposite the first slot, and the first and second retainers preferably comprise end legs of a U-shaped member formed integrally with the sleeve and extending downwardly from the sleeve, the U-shaped member further comprising a center leg connecting the end legs to one another and extending through the first and third slots.

Another object of the invention is to provide an improved coupling for connecting an adapter shaft of a dispensing mechanism to a driven output shaft of the mechanism.

In accordance with another aspect of the invention, this object is achieved by providing, as the coupling, a tubular cup and a nut-and-bolt assembly. The cup has an upper end affixed to the output shaft, extends axially downwardly from the output shaft, terminates in an open lower end, and surrounds the upper end portion of the adapter shaft. First and second radially opposed, axially extending slots are formed in the cup between the upper and lower ends thereof. First and second radially opposed, axially extending slits are formed in the cup and extend from the lower end thereof towards the upper end thereof. The bolt has 1) a head which is positioned radially beyond the first slot in the cup and 2) a threaded shank which extends from the first slot in the cup, through the bore in the adapter shaft, and through the second slot in the cup. The diameter of the shank is smaller than the diameter of the first and second slots so as to permit the bolt to move axially through the first and second slots. The nut is threaded onto the shank of the bolt and, upon rotation with respect to the bolt, is movable axially along the bolt towards the cup to compress the cup, thereby decreasing the widths of the first and second slits and clamping the cup onto the adapter shaft thereby to prevent axial or rotational movement of the adapter shaft with respect to the cup.

Yet another object of the invention is to provide an improved method of coupling the shaft of an auger of a dispensing mechanism to a drive shaft of the mechanism.

In accordance with another aspect of the invention, this object is achieved by positioning a key on the drive shaft at a location above a bottom of the lower end portion, the key including a tubular sleeve and a retainer which is mounted on the sleeve. The auger shaft is then moved upwardly into a pocket, formed in the lower end portion of the drive shaft, such that a pin which projects outwardly from the auger shaft moves into and along a first slot in the drive shaft. The auger shaft is then rotated to drive the pin from the first slot into a second slot which extends peripherally from the first slot. The key then is moved downwardly to a position in which the retainer locks the pin in the second slot. Preferably, during the step of moving the key downwardly, the retainer locks the pin in position within the second slot thereby to prevent the auger shaft from moving either axially, radially, or rotationally with respect to the drive shaft.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment to the invention is illustrated in the accompanying drawings in which like reference numerals represent like parts throughout, and in which.

DETAILED DESCRIPTION OF THE PREFERRED EMBODIMENTS

1. Resume

Pursuant to the invention, an improved quick-connect coupling facilitates the connection of an auger of a dispensing mechanism to the drive shaft of the dispensing mechanism so as to firmly lock the auger from radial, axial, or rotational movement with respect to the drive shaft while inhibiting contamination and facilitating cleaning. The coupling includes a male portion provided on the auger shaft and including one or more pins, a female portion formed in the adapter shaft and including one or more axial and peripheral slots, and a key which firmly locks the pin in the peripheral slot. The key includes a retainer which is affixed to a sleeve or other device serving as a guide and support for the retainer. Upon downward movement of the sleeve along the drive shaft, the retainer acts as a cam to lock the pins in position. If the dispensing mechanism employs an adapter shaft as the drive shaft, an improved quick-connect coupling may also be provided to attach the adapter shaft to the drive mechanism output shaft.

2. System Overview

Figure 2:
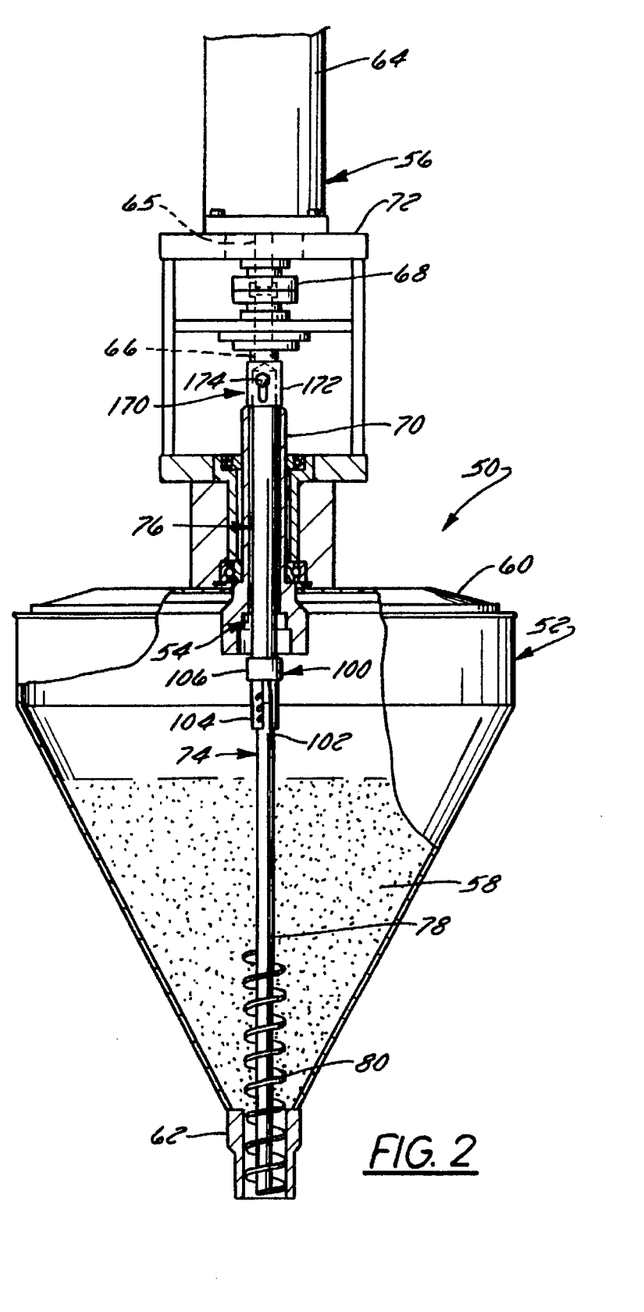
FIG. 2 is a partially cut-away, partially fragmentary side elevation view of a dispensing mechanism constructed in accordance with a preferred embodiment of the invention.
Figure 3:
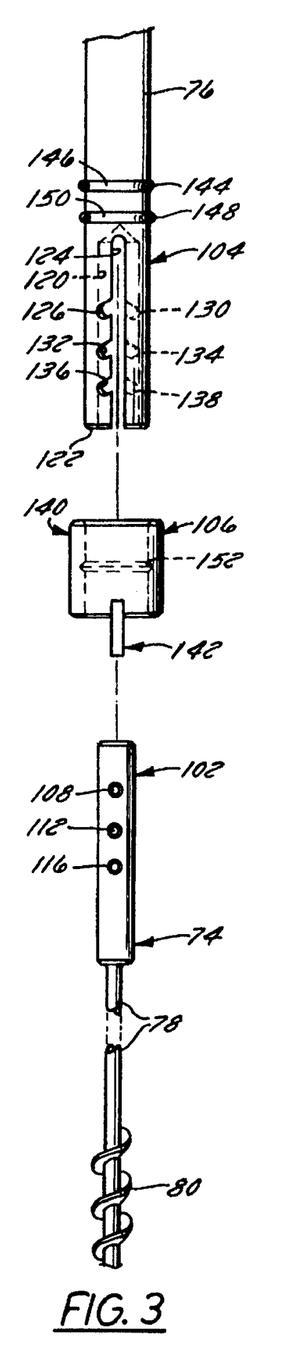
FIG. 3 is a partially fragmentary, exploded side elevation view of a portion of the dispensing mechanism of FIG. 2 including the lower end portion of the adapter shaft, a portion of the auger of the dispensing mechanism, and a quick-connect coupling for connecting the shaft of the auger to the adapter shaft.
Figure 4:
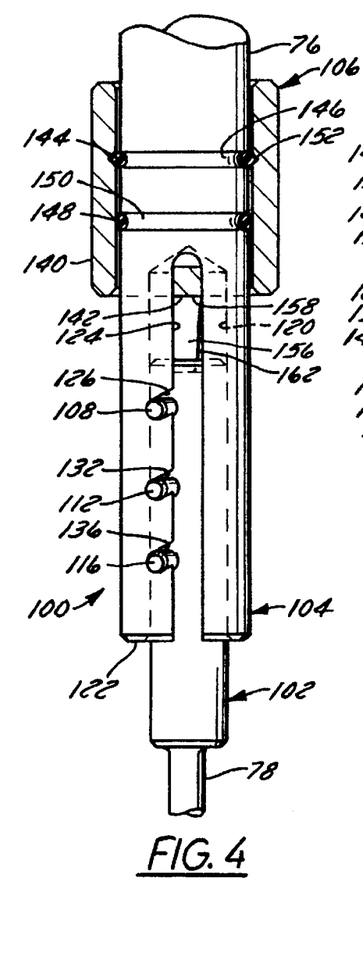
FIG. 4 is a sectional side elevation view of the portions of the dispensing mechanism illustrated in FIG. 3, showing the quick-connect coupling of the mechanism in an intermediate stage of coupling.
Figure 5:
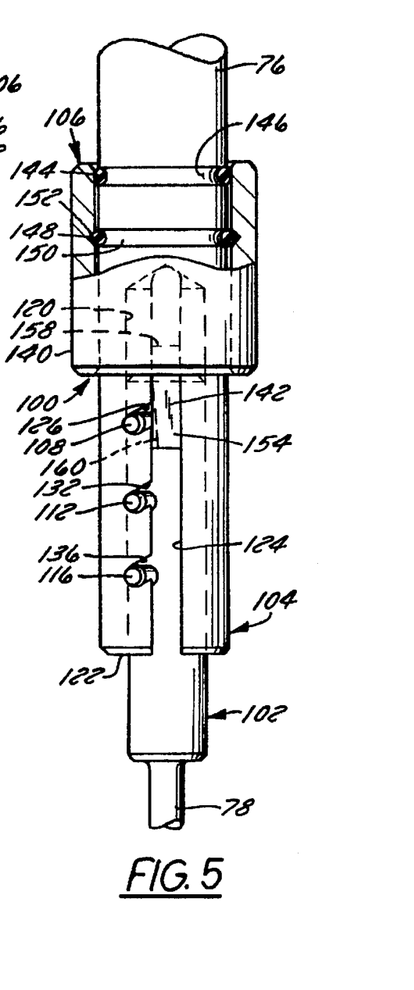
FIG. 5 corresponds to FIG. 4 and shows the quick-connect coupling of FIG. 3 in its fully-coupled position.
Figure 6:
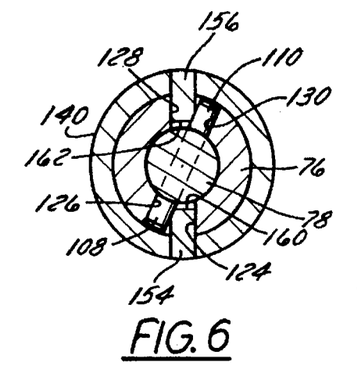
FIG. 6 is a sectional plan view of the quick-connect coupling of FIG. 5.

The inventive concepts are useable in virtually any dispensing mechanism in which a screw conveyor or auger is driven under a motive power source to dispense granular or particulate materials from a hopper. Referring to FIG. 2, a preferred dispensing mechanism 50 includes a hopper 52, a dispensing auger assembly 54, and a drive mechanism 56 which causes the dispensing auger assembly 54 to dispense metered quantities of particulate materials 58 from the hopper 52. The dispensing mechanism 50 can be adapted to dispense virtually any granular particulate material raging from very course granules such as beans, or popcorn down to very free particles such as finely ground material, cake mixes, pharmaceuticals, spices, etc.

The hopper 52 is, per se, conventional and may vary significantly in size, configuration, and proportions depending upon the quality and quantity of materials 58 being dispensed. In the illustrated embodiment, the hopper 52 is about 48 inches in height and is generally frusto-conical in shape. The hopper 52 has an upper, relatively large fill opening capped with a lid 60. The hopper 52 further includes a lower, central discharge opening emptying into a relatively short discharge spout 62 through which the materials 58 in the hopper 52 are dispensed and deposited in containers (not shown) located beneath the spout 62.

The drive mechanism 56 is also conventional per se and may incorporate any of a variety of motive power devices to effect rotation of the dispensing auger assembly 54. In the illustrated embodiment, the drive mechanism 56 takes the form of a servo assembly 64 and an output shaft 66 connected to the servo assembly 64 by a flexible coupling 68. The servo assembly 64 may be mounted on a support stand positioned beside the hopper 52 or, as in the illustrated embodiment, may be mounted on the hopper 52 by a support assembly. The support assembly includes 1) a tubular agitator spindle 70 which receives the dispensing auger assembly 54 with sufficient radial clearance to permit assembly, disassembly, and removal of the auger assembly 54, and 2) a support frame 72 which is supported on the lid 60, which surrounds the sleeve 70, and on which is mounted the servo assembly 64 and the flexible coupling 68.

The dispensing auger assembly 54 comprises an auger 74 coupled to a drive shaft which could comprise an output shaft of the drive mechanism but which, in the illustrated embodiment and in most practical applications of the invention, comprises an adapter shaft 76 which is in turn connected to the output shaft 66. The auger 74 includes a shaft 78 having helical flights 80 mounted on the lower portion thereof. The flights 80 extend through the discharge opening of the hopper 72 and into the spout 62 such that, upon rotation of the auger 74, controlled quantities of the materials 58 stored in the hopper 52 are dispensed from the spout 62 by the auger 74.

Lower and upper couplings 100 and 170 are provided for connecting the auger shaft 78 to the adapter shaft 76 and for connecting the adapter shaft 76 to the output shaft 66, respectively. Each of these couplings will now be described in turn.

3. Construction and Operation of Lower Coupling

The lower coupling 100 is a quick-connect coupling designed to facilitate attachment and removal of the auger shaft 78 to and from the adapter shaft 76 while inhibiting contamination and facilitating cleaning. Referring especially to FIGS. 3–8, the illustrated coupling 100 includes a male portion 102 formed integrally with the upper end portion of the auger shaft 78, a female portion 104 formed integrally with the lower end portion of the adapter shaft 76, and a key 106.

The male portion 102 of the lower coupling 100 includes the upper end portion of the auger shaft 78 and one or more pins which are similar or even identical to those found in conventional bayonet couplings. Although it is conceivable that only a single pin could be used, most applications will utilize at least first and second pins 108 and 110 disposed in a common horizontal plane and extending in opposite directions from radially opposite sides of the auger shaft 78. (The second pin 110 is seen only in FIGS. 6 and 8.) Additional sets of pins may be incorporated into the design to provide additional support in applications in which the auger 74 is relatively heavy and/or is subject to substantial loads by the materials 58 being dispensed. In the illustrated embodiment, two additional sets of pins are disposed vertically beneath the first set and include third through sixth pins 112, 114, 116 and 118.

The female portion 104 of the coupling 100 comprises a downwardly-facing pocket 120 which is formed in the lower end portion of the adapter shaft 76 and which is adapted to receive the male portion 102 formed on the upper end portion of the auger shaft 78. A system of slots is formed in the peripheral wall of the pocket 120 and is adapted to receive and hold the pins of the male portion 102. Specifically, a first slot 124 extends axially upwardly from a bottom surface 122 of the adapter shaft 76 towards the top of the pocket 120, and a second slot 126 of essentially constant width extends peripherally from the first slot 124. Slot 126 could extend horizontally. However, it is preferred that slot 126 extend downwardly at an acute angle as illustrated such that, during assembly, the pin 108 drops into place to prevent the auger 74 from inadvertently falling out of place prior to completion of the coupling operation. A third slot 128 (best seen in FIG. 6), disposed in a common vertical plane with the first slot 124, extends axially upwardly from the bottom surface 122 of the adapter shaft 76 at a location radially opposite the first slot 124. A fourth slot 130 of essentially constant width extends peripherally from the third slot 128 at an acute angle and is adapted to receive the second pin 110. In the illustrated embodiment in which additional sets of pins are incorporated into the design to provide additional support, additional peripheral slots 132, 134, 136, and 138 are also formed below the second and fourth slots 126 and 130 to receive the additional pins 112, 114, 116, and 118.

The key 106 is configured to lock the first and second pins 108 and 110 in place within the second and fourth slots 126 and 130 and to prevent the auger shaft 78 from moving axially, radially, rotationally with respect to the adapter shaft 76. The key 106 comprises a tubular sleeve 140 and a retainer 142, preferably formed integrally from a piece of tubular metal stock. The tubular sleeve 140 has a diameter which sufficiently larger than the diameter of the lower end of the adapter shaft 76 to permit the key 106 to slide axially along the adapter shaft 76 as detailed below. The illustrated sleeve 140 is relatively short, but it could be much longer so as to facilitate access to the sleeve 140 from above the hopper 52. A first O-ring 144 is mounted in a first groove 146 formed in the lower end portion of the adapter shaft 76 and engages and seals against the inner peripheral surface of the sleeve 140 so as to inhibit materials from compacting in the space between the sleeve 140 and the adapter shaft 76. A second O-ring 148 is mounted in a second groove 150 formed in the lower end portion of the adapter shaft 76 at a location beneath the first groove 146 and engages a complementary groove 152 formed in the inner peripheral surface of the sleeve 140 to lock the sleeve in position.

Figure 7:
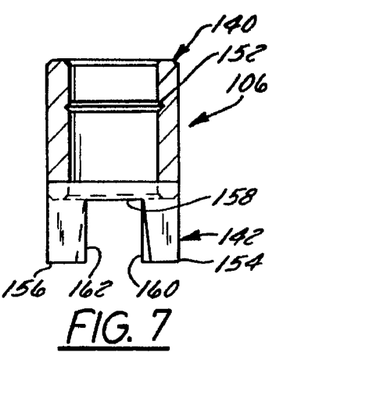
FIG. 7 is a sectional side elevation view of the key of the quick-connect coupling of FIGS. 3–6.
Figure 8:
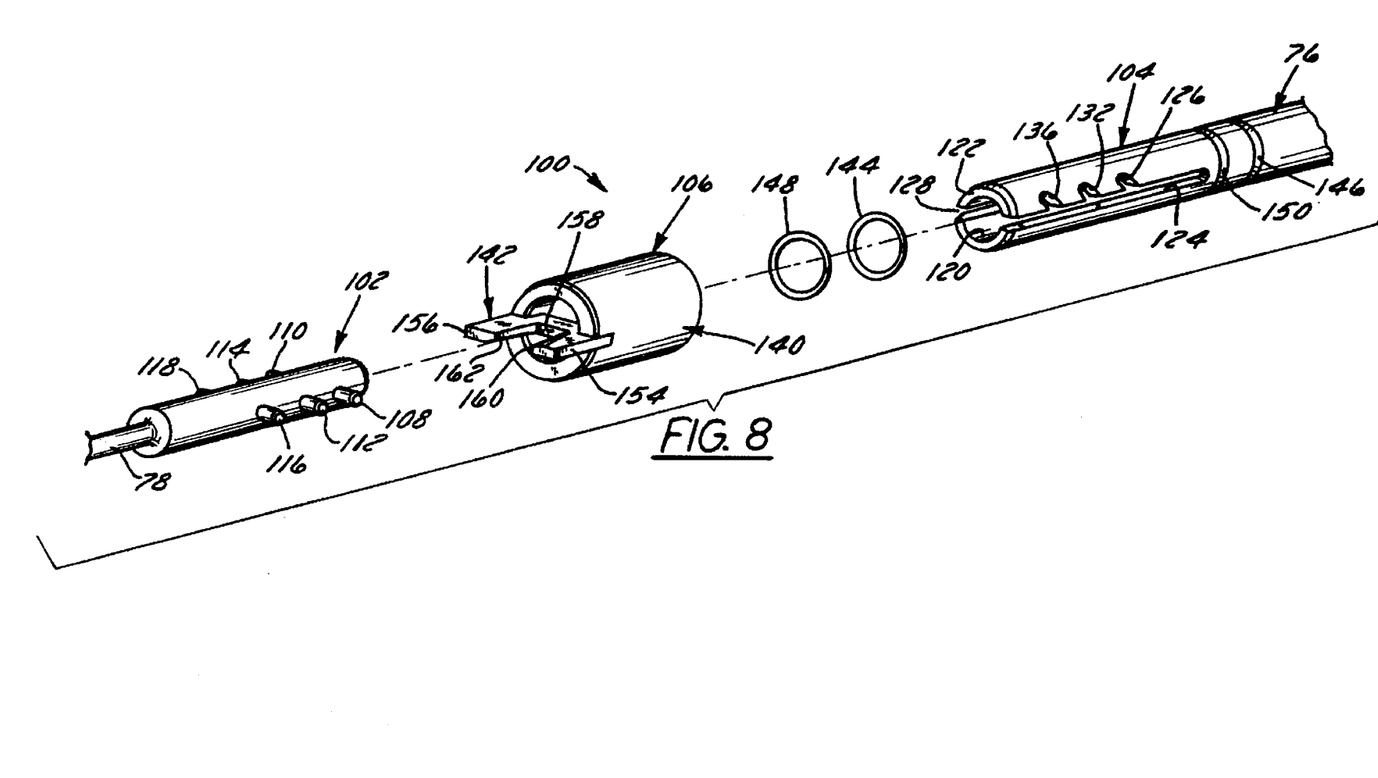
FIG. 8 is an exploded perspective view of the portion of the dispensing mechanism illustrated in FIGS. 3–7.

The retainer 142 comprises a U-shaped member extending downwardly from the sleeve 140. The U-shaped retainer 142 includes 1) first and second legs 154, 156 slidably received in the first and third slots 124 and 128 of the female coupling portion 104, and 2) a center leg 158 connecting the first and second legs 154, 156 to one another and extending through the first and third slots 124 and 128. As best seen in FIG. 7, the radial inner surface 160, 162 of each leg 154, 156 is chamfered such that it decreases in width from an upper end thereof to a lower end thereof so that it acts as a cam in a manner detailed below.

The manner in which the lower coupling 100 is used to connect the auger shaft 78 to the adapter shaft 76 or another drive shaft will now be described. First, the key 106 is slid onto the lower end portion of the adapter shaft 76 and pushed upwardly to a position illustrated in FIG. 4 in which the axial ends of the retainer legs 154 and 156 are located above the second and fourth slots 126 and 130. Then, the auger shaft 78 is lifted upwardly into the pocket 120 such that the pins 108 and 110 move into and along the first and third slots 124 and 128 in the adapter shaft 76 to a position in which they are in horizontal alignment with the inlets of the second and fourth slots 126 and 130. The auger shaft 78 is then rotated to drive the first and second pins 108 and 110 into the second and fourth slots 126 and 130 (of course, the remaining pins 112, 114, 116 and 118 also are driven into their mating slots 132, 134, 136 and 138 at this time). The key 106 is then moved downwardly from the position illustrated in FIG. 4 to the position illustrated in FIG. 5 in which the groove 152 in the key 106 engages the lower O-ring 148. During this motion, and due to the configuration and dimensions of 1) the first and second pins 108 and 110, 2) the end legs of the retainer 142, and 3) the second and fourth slots 126 and 130, the chamfered surfaces 160 and 162 on the retainer legs 154 and 156 act as cams which lock the first and second pins 108 and 110 in position within the second and fourth slots 126 and 130 to prevent the auger shaft 78 from moving axially, radially, or rotationally with respect to the adapter shaft 76. This locking action prevents any play between the auger shaft 78 and the adapter shaft 76 and therefore enhances the ability of the servo assembly 64 to operate as intended.

It can therefore be seen that the lower coupling 100 is relatively simple in construction and easy to use yet firmly locks the auger 74 to the adapter shaft 76. It is also easy to clean because it lacks any spring in which materials could be compacted and also lacks any chambers or crevices which are not easily accessible by a cleaning brush or other cleaning implement.

4. Construction and Operation of Upper Coupling

The upper coupling 170 could take the form of a conventional left-handed threaded connection of the type described above. It also could be identical in construction and operation to the lower coupling 100 if vertical adjustment of the adapter shaft 78 relative to the output shaft 66 is not required.

Figure 9:
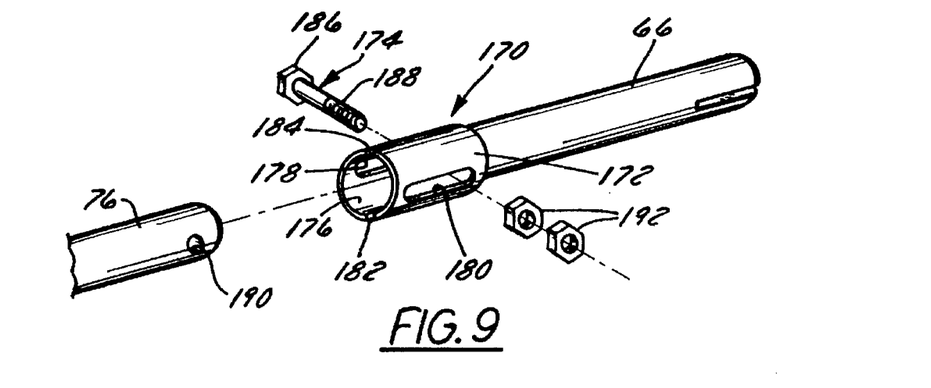
FIG. 9 is an exploded perspective view of a portion of the dispensing mechanism illustrated in FIG. 2 including the upper end of the adapter shaft, the lower end of the drive mechanism output shaft, and a quick-connect coupling for connecting the adapter shaft to the output shaft.
Figure 10:
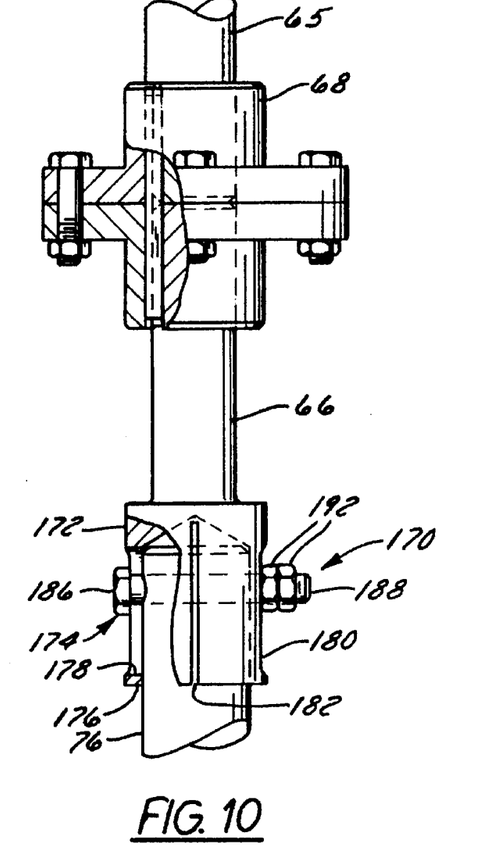
FIG. 10 is partially cut-away side elevation view generally corresponding to FIG. 9 and illustrating the quick-connect coupling in its fully-coupled position.
Figure 11:
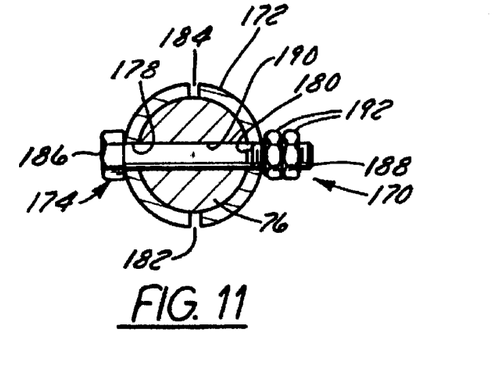
FIG. 11 is a sectional plan view of the quick-connect coupling of FIG. 10.

However, in the illustrated and preferred embodiment, illustrated in FIG. 2 and best seen in FIGS. 9–11, the upper coupling 170 includes a tubular cup 172 and a bolt 174. The tubular cup 172 has an upper end affixed to the output shaft 66 and extends axially downwardly from the output shaft 66. The cup 172 is open at its lower end 176 and is dimensioned and configured to surround the upper end portion of the adapter shaft 76 when assembly is complete. First and second radially opposed, axially extending slots 178 and 180 are formed in the cup 172 between the upper and lower ends thereof for slidably receiving the bolt 174 as detailed below. First and second radially opposed, axially extending slits 182 and 184 are formed in the cup 172 peripherally between the slots 178 and 180 and extend from the bottom end 176 of the cup 172 towards the upper end thereof but stop short of the upper end. The slits 182 and 184 permit the cup 172 to be compressed radially from a first diameter in which it slidably receives the upper end of the adapter shaft 76 to a second diameter in which it firmly clamps or locks onto the upper end of the adapter shaft 76. In the assembled condition of the coupling, the head 186 of the bolt 174 is positioned radially beyond the first slot 178 and a shank 188 extends through the first slot 178, through a horizontal bore 190 formed through the upper end portion of the adapter shaft 76, and through the second slot 180. The diameter of the shank 188 is sufficiently smaller than the diameter of the first and second slots 178 and 180 to permit the bolt 174 to move axially through the first and second slots 178 and 180 for assembly and/or adjustment purposes.

To couple the adapter shaft 76 to the output shaft 66, one merely moves the adapter shaft 76 upwardly into a position in which the upper end portion of the adapter shaft 76 is received in the cup 172 and in which the bore 190 in the adapter shaft 76 is aligned with the first and second slots 178, 180 in the cup 172. The shank 188 of the bolt 174 is then inserted through the first slot 178, the bore 190, and the second slot 180 such that it extends beyond the second slot 180. One or more nuts 192 is then loosely threaded onto the shank 188. The adapter shaft 76 can then be moved axially with respect to the cup 172 (with the bolt 174 moving axially through the first and second slots 178 and 180) to a desired position which can be easily checked with a micrometer or the like. The nuts 192 are then tightened onto the bolt 174 so as to compress the cup 172, thereby decreasing the widths of the first and second slits 182 and 184 and clamping the cup 172 onto the adapter shaft 76 to prevent axial or rotational movement of the adapter shaft 76 with respect to the output shaft 66.

The upper coupling 170, unlike the lower coupling 100, permits vertical adjustment between the shafts which are coupled together. Moreover, while vertical adjustment can be performed with virtually the same precision as a threaded coupling used in some other dispensing mechanisms, it is much simpler to fabricate and somewhat simpler to operate than conventional threaded couplings.

Many changes and modifications could be made to the invention without departing from the spirit thereof. For instance, the sleeve of the lower coupling could be replaced by a rod extending through the center of the drive shaft or by another device capable of supporting and guiding the retainer. Moreover, both couplings are usable with a horizontal dispenser in which all operative components extend horizontally rather than vertically. The scope of these and other changes will become apparent from a reading of the appended claims.

We claim:

1. A dispensing mechanism comprising:
   (A) a hopper which has a discharge opening;
   (B) a drive mechanism;
   (C) a drive shaft which has a first end portion operatively coupled to said drive mechanism and which has a second end portion positioned between said first end portion thereof and said discharge opening of said hopper and terminating at an axial end surface, wherein said second end portion is tubular and presents a pocket, wherein
      a first slot extends at least generally axially away from said axial end surface of said second end portion, and wherein
      a second slot extends peripherally from said first slot;
   (D) an auger including
      (1) an auger shaft which extends from said drive shaft towards said opening in said hopper and which has a first end portion positioned within said pocket in said drive shaft, and
      (2) helical flights which are mounted on a second end portion of said auger shaft, and
      (3) a pin which extends away from said auger shaft and which is received in said second slot in said drive shaft; and
   (E) a key which locks said pin in said second slot, said key comprising
      (1) a guide and support device slidably mounted on said second end portion of said drive shaft, and
      (2) a retainer which is mounted on said guide and support device, which is received in said first slot in said drive shaft, and which locks said pin in said second slot, wherein said second slot, said pin, and said retainer are dimensioned and configured such that said retainer prevents said auger shaft from moving axially, radially, or rotationally with respect to said drive shaft by acting as cam which engages said pin and locks said pin in position within said second slot.

2. A dispensing mechanism as defined in claim 1, wherein said drive shaft is an adapter shaft which has a bore formed radially through the first end portion thereof, and further comprising a coupling which releasably connects said adapter shaft to an output shaft of said drive mechanism, said coupling including a tubular cup which has a first end affixed to said output shaft, which extends axially from said output shaft, which terminates in an open second end, and which surrounds said first end portion of said adapter shaft, wherein first and second radially opposed, axially extending slots are formed in said cup between said first and second ends thereof, and wherein first and second radially opposed, axially extending slits are formed in said cup at a location peripherally between said first and second slots and extend from said second end thereof towards said first end thereof;

a bolt, said bolt having 1) a head which is positioned radially beyond said first slot in said cup and 2) a shank which extends from said first slot in said cup, through said bore in said adapter shaft, and through said second slot in said cup, at least a portion of said shank being threaded, wherein the diameter of said shank is smaller than the diameter of said first and second slots so as to permit said bolt to move axially through said first and second slots; and a nut which is threaded onto said shank of said bolt and which, upon rotation with respect to said bolt, is movable axially along said bolt towards said cup to compress said cup, thereby decreasing the widths of said first and second slits and clamping said cup onto said adapter shaft thereby to prevent axial or rotational movement of said adapter shaft with respect to said cup.

3. A dispensing mechanism as defined in claim 1, wherein said retainer extends into said first slot and is chamfered such that a radial inner surface thereof decreases continuously in width from an upper end thereof to a lower end thereof and engages said pin to lock said pin in position within said second slot.

4. A dispensing mechanism as defined in claim 1, wherein said drive mechanism is located vertically above said hopper, said first end of said drive shaft is an upper end, said second end of said drive shaft is a lower end, said first end of said auger shaft is an upper end, and said second end of said auger shaft is a lower end.

5. A dispensing mechanism as defined in claim 4, wherein said second slot extends at an acute angle from said first slot.

6. A dispensing mechanism as defined in claim 4, wherein said guide and support device comprises a tubular sleeve, and further comprising a second pin which extends away from said auger shaft, wherein a third slot extends at least generally axially upwardly from said bottom surface of said lower end portion of said drive shaft, wherein a fourth slot extends peripherally from said third slot and receives said second pin, and wherein said key further comprise a second retainer which is mounted on said sleeve, which is received in said third slot in said drive shaft, and which locks said second pin in said fourth slot.

7. A dispensing mechanism as defined in claim 6, wherein said third slot is located radially opposite said first slot, and wherein said first and second retainers comprise end legs of a U-shaped member formed integrally with said sleeve and extending downwardly from said sleeve, said U-shaped member further comprising a center leg connecting said end legs to one another and extending through said first and third slots.

8. A dispensing mechanism comprising:

(A) a hopper which has a discharge opening;

(B) a drive mechanism;

(C) a drive shaft which has a first end portion operatively coupled to said drive mechanism and which has a second end portion positioned between said first end portion thereof and said discharge opening of said hopper and terminating at an axial end surface, wherein said second end portion is tubular and presents a pocket, wherein a first slot extends at least generally axially away from said axial end surface of said second end portion, wherein a second slot extends peripherally from said first slot, wherein a third slot extends at least generally axially from said axial end surface of said second end portion, and wherein a fourth slot extends peripherally from said third slot;

(D) an auger including (1) an auger shaft which extends from said drive shaft towards said opening in said hopper and which has a first end portion positioned within said pocket in said drive shaft, and (2) helical flights which are mounted on a second end portion of said auger shaft, (3) a first pin which extends away from said auger shaft and which is received in said second slot in said drive shaft, and (4) a second pin which extends away from said auger shaft and which is received in said fourth slot in said drive shaft;

(E) a key which locks said pin in said second slot, said key comprising (1) a guide and support device comprising a tubular sleeve slidably mounted on said second end portion of said drive shaft, (2) a first retainer which is mounted on said guide and support device, which is received in said first slot in said drive shaft, and which locks said first pin in said second slot, and (3) a second retainer which is mounted on said guide and support device, which is received in said third slot in said drive shaft, and which locks said second pin in said fourth slot, further comprising 1) a third pin which extends away from said auger shaft and which is aligned axially with said first pin, and 2) a fourth pin which extends away from said auger shaft and which is aligned axially with said second pin, wherein a fifth slot is located axially between said axial end surface of said second end portion of said drive shaft and said second slot, extends peripherally from said first slot, and receives said third pin, and wherein a sixth slot is located axially between said axial end surface of said second end portion of said drive shaft and said fourth slot, extends peripherally from said third slot, and receives said fourth pin.

9. A dispensing mechanism comprising:

(A) a hopper which has a discharge opening;

(B) a drive mechanism;

(C) a drive shaft which has a first end portion operatively coupled to said drive mechanism and which has a second end portion positioned between said first end portion thereof and said discharge opening of said hopper and terminating at an axial end surface, wherein said second end portion is tubular and presents a pocket, wherein a first slot extends at least generally axially away from said axial end surface of said second end portion, and wherein a second slot extends peripherally from said first slot;

(D) an auger including (1) an auger shaft which extends from said drive shaft towards said opening in said hopper and which has a first end portion positioned within said pocket in said drive shaft, and (2) helical flights which are mounted on a second end portion of said auger shaft, and (3) a pin which extends away from said auger shaft and which is received in said second slot in said drive shaft; and (E) a key which locks said pin in said second slot, said key comprising (1) a guide and support device including a sleeve slidably mounted on said second end portion of said drive shaft, and (2) a retainer which is mounted on said guide and support device, which is received in said first slot in said drive shaft, and which locks said pin in said second slot, further comprising a first ring which is mounted in a first groove formed in said second end portion of said drive shaft and which engages and seals against an inner peripheral surface of said sleeve peripheral surface of said sleeve to lock said sleeve axially in position.

10. A dispensing mechanism as defined in claim 9, further comprising a second ring which is mounted in a second groove formed in said end portion of said drive shaft at a location between said axial end surface of said drive shaft and said first groove, said second ring engaging a groove formed in said inner periphal surface of said sleeve to lock said sleeve axially in position.

11. A dispensing mechanism comprising:
(A) a frusto-conical hopper which has a lower discharge opening;
(B) a servo assembly which is located above said hopper;
(C) a drive shaft which has an upper end portion operatively coupled to said servo assembly and which has a lower end portion positioned between said upper end portion thereof and said discharge opening of said hopper and terminating at a bottom surface, wherein said lower end portion of said drive shaft is tubular and presents a pocket,
a first slot extends axially upwardly from said bottom surface of said drive shaft,
a second slot of essentially constant width extends peripherally from said first slot at an acute angle,
a third slot is disposed in a common vertical plane with said first slot and extends axially upwardly from said bottom surface of said drive shaft at a location radially opposite said first slot, and wherein
a fourth slot of essentially constant width extends peripherally from said third slot at an acute angle;
(D) an auger including
(1) an auger shaft, said auger shaft having a lower end portion extending through said discharge opening of said hopper and having an upper end portion positioned within said pocket in said drive shaft,
(2) helical flights which are mounted on said lower end portion of said auger shaft,
(3) a first pin which extends radially away from said auger shaft and which is received in said second slot in said drive shaft, and
(4) a second pin which is disposed in a common horizontal plane with said first pin, which extends radially away from said auger shaft, and which is received in said fourth slot in said drive shaft;
(E) a key which locks said first and second pins in said second and fourth slots, said key including
(1) a sleeve slidably mounted on said lower end portion of said drive shaft; and
(2) a retainer which is mounted on said sleeve, said retainer comprising a U-shaped member formed integrally with said sleeve and extending downwardly from said sleeve, said U-shaped member comprising (a) first and second end legs slidably received in said first and third slots, respectively, and (b) a center leg which connects said first and second end legs to one another and which extends through said first and third slots, wherein each of said end legs is chamfered such that a radial inner surface thereof decreases in width from an upper end thereof to a lower end thereof, and wherein said second and fourth slots, said first and second pins, and said legs of said retainer are dimensioned and configured such that said retainer locks said first and second pins in position within said second and fourth slots and prevents said auger shaft from moving axially, radially, or rotationally with respect to said drive shaft;
(F) a first O-ring which is mounted in a first groove formed in said second end portion of said drive shaft and which engages and seals against in inner peripheral surface of said sleeve; and
(G) a second O-ring which mounted in a second groove formed in said lower end portion of said drive shaft at a location beneath said first groove, said second O-ring engaging a groove formed in said inner peripheral surface of said sleeve to lock said sleeve in position.

12. A dispensing mechanism comprising:
(A) a hopper which has a lower discharge opening;
(B) a drive mechanism which is located above said hopper;
(C) an output shaft which has an upper end portion operatively coupled to said drive mechanism and which has a lower end portion;
(D) an adapter shaft which extends into said hopper; and
(E) a coupling which releasably connects said adapter shaft to said output shaft, said coupling including
(1) a tubular cup which has an upper end affixed to said output shaft, which extends axially downwardly from said output shaft, which terminates in an open lower end, and which surrounds said upper end portion of said adapter shaft, wherein first and second radially opposed, axially extending slots are formed in said cup between said upper and lower ends thereof, and wherein first and second radially opposed, axially extending slits are formed in said cup and extend from said lower end thereof towards said upper end thereof,
(2) a bolt, said bolt having 1) a head which is positioned radially beyond said first slot in said cup and 2) a shank which extends from said first slot in said cup, through said bore in said adapter shaft, and through said second slot in said cup, at least a portion of said shank being threaded, wherein the diameter of said shank is smaller than the diameter of said first and second slots so as to permit said bolt to move axially through said first and second slots, and
(3) a nut which is threaded onto said shank of said bolt and which, upon rotation with respect to said bolt, is movable axially along said bolt towards said cup to compress said cup, thereby decreasing the widths of said first and second slits and clamping said cup onto said adapter shaft thereby to prevent axial or rotational movement of said adapter shaft with respect to said cup.

13. A method of attaching a first end portion of an auger shaft of a dispensing mechanism to a second end portion of a drive shaft of said dispensing mechanism, said method comprising:
(A) positioning a key on said drive shaft at a location spaced from an axial end surface of said second end portion, said key including a retainer;
(B) moving said first end portion of said auger shaft into a pocket, formed in said second end portion of said drive shaft, such that a pin which projects outwardly from said auger shaft moves into and along a first slot in said drive shaft; then
(C) rotating said auger shaft to drive said pin from said first slot into a second slot which extends peripherally from said first slot; then
(D) moving said key to a position in which said retainer engages said pin and acts as a cam to drive said pin into a position in which said pin is locked by said retainer in said second slot from moving either axially, radially, or rotationally with respect to said drive shaft.

14. A method as defined in claim 13, wherein said drive shaft is an adapter shaft, and further comprising attaching said adapter shaft to an output shaft of a drive mechanism of said dispensing mechanism, said attaching step including
moving said adapter shaft into a position in which a first end portion of said adapter shaft is received in a cup extending from said output shaft, said cup having 1)

first and second radially opposed, axially extending slots formed therein between first and second ends thereof, and 2) first and second radially opposed, axially extending slits formed therein and extending from said second end thereof towards said first end thereof, inserting a bolt through said first slot in said cup, through a bore formed radially through said adapter shaft, and through said second slot in said cup, then moving said adapter shaft axially with respect to said cup such that said bolt moves axially through said first and second slots, and then tightening a nut onto said bolt so as to compress said cup, thereby decreasing the widths of said first and second slits and clamping said cup onto said adapter shaft to prevent axial, radial, or rotational movement of said adapter shaft with respect to said cup.

15. A method as defined in claim 13, wherein, during the step of moving said key, a chamfered surface on said retainer engages said pin.

16. A method as defined in claim 13, further comprising sealing an inner peripheral surface of a sleeve of said key against a sealing ring during the step of moving the key.

17. A method as defined in claim 16, further comprising retaining said sleeve in a locked position thereof after said step (D) by causing a ring on said drive shaft to engage a groove formed in the inner peripheral surface of said sleeve.

* * * * *